(12) United States Patent
Imakita et al.

(10) Patent No.: US 7,833,920 B2
(45) Date of Patent: Nov. 16, 2010

(54) OPTICAL GLASS

(75) Inventors: Kenji Imakita, Tokyo (JP); Naoki Sugimoto, Tokyo (JP)

(73) Assignee: Asahi Glass Company, Limited, Tokyo (JP)

(*) Notice: Subject to any disclaimer, the term of this patent is extended or adjusted under 35 U.S.C. 154(b) by 0 days.

(21) Appl. No.: 12/273,574

(22) Filed: Nov. 19, 2008

(65) Prior Publication Data

US 2009/0075806 A1 Mar. 19, 2009

Related U.S. Application Data

(63) Continuation of application No. PCT/JP2007/060460, filed on May 22, 2007.

(30) Foreign Application Priority Data

May 22, 2006 (JP) .................. 2006-141852

(51) Int. Cl.
C03C 3/066 (2006.01)
C03C 3/093 (2006.01)

(52) U.S. Cl. .................. 501/79; 501/67

(58) Field of Classification Search .......... 501/67, 501/79

See application file for complete search history.

(56) References Cited

U.S. PATENT DOCUMENTS

| 5,300,467 | A  | * | 4/1994  | Ishizaki et al. ........ 501/67 |
| 6,346,493 | B1 | * | 2/2002  | Kniajer et al. ........ 501/17 |
| 7,033,966 | B2 |   | 4/2006  | Kobayashi et al.    |
| 7,605,100 | B2 | * | 10/2009 | Wolff et al. ........ 501/67 |
| 2003/0013595 | A1 | * | 1/2003  | Uehara ........ 501/77 |
| 2005/0164864 | A1 | * | 7/2005  | Kasuga et al. ........ 501/78 |
| 2007/0054795 | A1 | * | 3/2007  | Wolff et al. ........ 501/66 |
| 2007/0105702 | A1 |   | 5/2007  | Matsumoto et al.    |
| 2008/0207427 | A1 |   | 8/2008  | Ohkawa et al.       |

FOREIGN PATENT DOCUMENTS

| JP | 60-122747 | | 7/1985 |
| JP | 03-037130 | | 2/1991 |
| JP | 04-037628 | | 2/1992 |
| JP | 04-092834 | | 3/1992 |
| JP | 05-246735 | | 9/1993 |
| JP | 07-149536 | | 6/1995 |
| JP | 08-119666 | | 5/1996 |
| JP | 08119666 A | * | 5/1996 |
| JP | 2003-089543 | | 3/2003 |

OTHER PUBLICATIONS

U.S. Appl. No. 12/192,149, filed Aug. 15, 2008, Imakita et al.
U.S. Appl. No. 12/195,496, filed Aug. 21, 2008, Ohkawa et al.
U.S. Appl. No. 12/195,477, filed Aug. 21, 2008, Sasai et al.
U.S. Appl. No. 12/404,026, filed Mar. 13, 2009, Imakita et al.

* cited by examiner

Primary Examiner—Karl E Group
Assistant Examiner—Elizabeth A Bolden
(74) Attorney, Agent, or Firm—Oblon, Spivak, McClelland, Maier & Neustadt, L.L.P.

(57) ABSTRACT

The invention provides an optical glass which comprises, in terms of % by mass on the basis of oxides, 35-45% of $SiO_2$, 12-20% of $B_2O_3$, 2-7% of $Li_2O$, 0.1-10% of ZnO, 2-15% of $Al_2O_3$, 10-40% of BaO, 0-5% of $K_2O$, 0-10% of $Na_2O$, and 0-20% of $Gd_2O_3$, wherein $SiO_2+B_2O_3$ is 47-58% and $Li_2O+Na_2O+K_2O$ is 5-14%.

18 Claims, No Drawings

US 7,833,920 B2

OPTICAL GLASS

TECHNICAL FIELD

The present invention relates to an optical glass suitable for precision press molding.

BACKGROUND ART

So-called medium-refractive-index low-dispersion optical lenses, which have a refractive index $n_d$ of 1.55-1.65 and an Abbe number $v_d$ of 55-65, are in wide use in the optical pickups of various optical disk systems including a CD, DVD, or the like and in video cameras, digital cameras, etc. The demand for these articles is growing remarkably in recent years and, with this trend, there is a desire for a medium-refractive-index low-dispersion optical lens which is more inexpensive and has high productivity.

For producing such optical lenses, the mold press forming process is extensively used in recent years as a process which attains high productivity and a low production cost. In this production process, a preformed glass heated to a temperature not lower than the glass transition temperature is pressed with two pairs of forming molds having high-precision surfaces and disposed on the upper and lower sides to thereby realize an optical lens having a desired shape. Compared to the conventional optical-lens production based on grinding/polishing, the mold press forming process comprises a smaller number of production steps and hence attains a lower production cost. There is a desire for a glass material capable of production by this process.

In order for an optical lens to be inexpensively produced by the mold press process, the glass is desired to have a low yield point Ts. This is because although molds having a release film or the like on the surface thereof are generally used in the mold press process in order to prevent the molds from fusion-bonding to the heated glass, the release film deteriorates upon exposure to high temperatures. Namely, for inexpensively producing an optical lens by the mold press process, an optical glass having a low yield point and low-temperature-softening properties is necessary.

An $SiO_2$—$PbO$—$R_2O$ glass has hitherto been used as an optical glass which has a medium refractive index and low-dispersion characteristics and has low-temperature-softening properties suitable for mold press forming. However, from the standpoint of concern for the environment, lead-free optical glasses are being developed recently. For example, an optical glass having low-temperature-softening properties, a medium refractive index, and low-dispersion characteristics has been proposed which is obtained by adding an alkali oxide such as $Li_2O$, $Na_2O$, or $K_2O$ to an $SiO_2$—$B_2O_3$—$RO$ glass.

However, it is known that addition of an alkali oxide to an $SiO_2$—$B_2O$—$RO$ glass generally results in impaired weatherability. Namely, low-temperature-softening properties and weatherability are antinomic. For example, the optical glass described in patent document 1 is sufficiently low in yield point and suitable for mold pressing but has insufficient weatherability. This optical glass is desired to be further improved. On the other hand, the optical glasses described in patent documents 2 and 3 have sufficient weatherability but have a relatively high yield point. These optical glasses are desired to have a lower yield point so as to produce an optical lens at a lower cost.

Patent Document 1: JP-A-7-149536
Patent Document 2: JP-A-60-122747
Patent Document 3: JP-A-4-37628

DISCLOSURE OF THE INVENTION

Problems to be Solved by the Invention

An object of the invention is to provide an optical glass which has a low yield point, excellent weatherability, a medium refractive index, and low-dispersion characteristics and is suitable for mold press forming.

Means for Solving the Problems

The present inventors made intensive investigations in order to accomplish the object. As a result, they have found that a medium-refractive-index low-dispersion optical glass having low-temperature-softening properties sufficient for press molding and further having excellent weatherability is obtained by optimizing the concentrations of the $SiO_2$ and $B_2O_3$ which form a glass framework in a glass containing $SiO_2$ as a main component.

Namely, the invention provides the following optical glasses.

(1) An optical glass which comprises, in terms of % by mass on the basis of oxides, 35-45% of $SiO_2$, 12-20% of $B_2O_3$, 2-7% of $Li_2O$, 0.1-10% of ZnO, 2-15% of $Al_2O_3$, 10-40% of BaO, 0-5% of $K_2O$, 0-10% of $Na_2O$, and 0-20% of $Gd_2O_3$, wherein $SiO_2+B_2O_3$ is 47-58% and $Li_2O+Na_2O+K_2O$ is 5-14%.

(2) The optical glass as described under (1) which has a refractive index $n_d$ of 1.55-1.65 and an Abbe number $v_d$ of 55-65.

(3) The optical glass as described under (1) or (2) which has a yield point Ts of 590° C. or lower.

(4) The optical glass as described under any one of (1) to (3) which shows a decrease in transmittance of less than 20% after being held for 100 hours in an environment having a temperature of 60° C. and a relative humidity of 90%.

ADVANTAGES OF THE INVENTION

According to the invention, an optical glass having optical properties including a refractive index $n_d$ of 1.55-1.65 and an Abbe number $v_d$ of 55-65 is obtained by constituting the glass so as to comprise $SiO_2$, $B_2O_3$, $Li_2O$, ZnO, $Al_2O_3$, and BaO as essential components. Furthermore, an optical glass which has practically sufficient weatherability and low-temperature-softening properties suitable for mold press forming, besides those optical properties, is obtained according to the invention. As a result, the degree of deterioration of the film on the mold surface is reduced and this improves mold durability and greatly improves productivity.

BEST MODE FOR CARRYING OUT THE INVENTION

The reasons for the limitation of each ingredient amount range in the optical glass of the invention (hereinafter referred to as "glass of the invention") are as follows.

$SiO_2$ is a main ingredient constituting a glass network and is an essential ingredient in the glass of the invention. The content of $SiO_2$ in the glass of the invention is 35% by mass (hereinafter, "% by mass" is abbreviated to "%") or lower from the standpoints of stabilizing the glass and improving unsusceptibility to devitrification and weatherability. In particular, the $SiO_2$ content is preferably 36% or higher, more preferably 37% or higher. On the other hand, too high $SiO_2$ contents result in a decrease in refractive index, resulting in difficulties in obtaining a desired refractive index. Because of this, the $SiO_2$ content in the glass of the invention is 45% or lower. The $SiO_2$ content in the glass of the invention is preferably 44% or lower, more preferably 43% or lower.

$B_2O_3$, like $SiO_2$, is an ingredient constituting a glass network and is an essential ingredient in the glass of the invention. Furthermore, $B_2O_3$ is an important ingredient influencing weatherability and optically is an ingredient which increases Abbe number. The content of $B_2O_3$ is 20% or lower from the standpoint of obtaining practically sufficient weatherability. The $B_2O_3$ content is more preferably 16% or lower, even more preferably 14.5% or lower. From the standpoints of imparting practically sufficient weatherability and obtaining the desired optical properties and low-temperature-softening properties, the $B_2O_3$ content is 12% or higher. The $B_2O_3$ content is more preferably 12.5% or higher, even more preferably 13% or higher.

Besides being ingredients constituting a glass network, $SiO_2$ and $B_2O_3$ function as ingredients which reduce refractive index. In the glass of the invention, the sum of the content of $SiO_2$ and the content of $B_2O_3$ is 58% or less from the standpoint of obtaining the desired optical properties. The sum of the $SiO_2$ content and the $B_2O_3$ content is more preferably 55.5% or less, even more preferably 55.2% or less. On the other hand, too small values of the sum of the $SiO_2$ content and the $B_2O_3$ content result in poor unsusceptibility of the glass to devitrification. Because of this, that sum in the glass of the invention is 47% or more. The sum of the $SiO_2$ content and the $B_2O_3$ content is more preferably 48% or more, even more preferably 50% or more.

$Li_2O$ is an ingredient for lowering yield point Ts and is an essential ingredient in the glass of the invention. From the standpoint of sufficiently obtaining that effect, the content of $Li_2O$ is 2% or higher. The $Li_2O$ content is more preferably 3% or higher, even more preferably 4% or higher. On the other hand, too high $Li_2O$ contents result in reduced weatherability. From the standpoint of obtaining practically sufficient weatherability, the $Li_2O$ content is 7% or lower. More preferably, the $Li_2O$ content is 6.5% or lower. The $Li_2O$ content is even more preferably 6.2% or lower.

$Na_2O$ is an ingredient for lowering yield point Ts and is not an essential ingredient in the glass of the invention. From the standpoint of sufficiently obtaining that effect, the content of $Na_2O$ in the glass of the invention is preferably 0.1% or higher. On the other hand, $Na_2O$ functions as an ingredient which impairs weatherability. Because of this, the $Na_2O$ content is preferably 10% or lower from the standpoint of obtaining practically sufficient weatherability. More preferably, the $Na_2O$ content is 8% or lower. The $Na_2O$ content is even more preferably 7% or lower.

$K_2O$ is an ingredient for lowering yield point Ts and is not an essential ingredient in the glass of the invention. $K_2O$, on the other hand, functions also as an ingredient which considerably impairs weatherability. From the standpoint of lowering glass transition temperature while maintaining weatherability, the content of $K_2O$ in the glass of the invention is preferably 5% or lower. More preferably, the $K_2O$ content is 3% or lower. The $K_2O$ content is even more preferably 1% or lower.

From the standpoint of obtaining practically sufficient weatherability, the sum of the $Li_2O$ content, $Na_2O$ content, and $K_2O$ content in the glass of the invention is 14% or less. More preferably, that sum is 13% or less. That sum is even more preferably 12% or less. On the other hand, from the standpoints of lowering yield point Ts and obtaining sufficient press formability, the sum of the $Li_2O$ content, $Na_2O$ content, and $K_2O$ content is 5% or more. More preferably, that sum is 6% or more. That sum is even more preferably 7% or more.

ZnO is an ingredient for stabilizing the glass while maintaining weatherability and is an essential ingredient in the glass of the invention. From the standpoint of sufficiently obtaining that effect, the content of ZnO is 0.1% or higher. More preferably, the ZnO content is 1% or higher. The ZnO content is even more preferably 2% or higher. On the other hand, too high ZnO contents result in a decrease in Abbe number. From the standpoint of obtaining the desired optical properties, the ZnO content is 10% or lower. More preferably, the ZnO content is 6% or lower. The ZnO content is even more preferably 5% or lower.

$Al_2O_3$ is an ingredient which contributes to an improvement in weatherability, and is an essential ingredient in the glass of the invention. From the standpoint of sufficiently obtaining that effect, the content of $Al_2O_3$ is 2% or higher. Preferably, the $Al_2O_3$ content is 3% or higher. The $Al_2O_3$ content is more preferably 3.5% or higher.

$Al_2O_3$, on the other hand, functions also as an ingredient which impairs devitrification characteristics. From the standpoint of obtaining practically sufficient devitrification characteristics, the content of $Al_2O_3$ is 15% or lower. Preferably, the $Al_2O_3$ content is 10% or lower. The $Al_2O_3$ content is more preferably 9% or lower.

BaO is an ingredient for stabilizing the glass while lowering yield point Ts and is an essential ingredient in the glass of the invention. However, BaO functions also as an ingredient which impairs weatherability. From the standpoint of obtaining a sufficiently low yield point Ts, the content of BaO is 10% or higher. Preferably, the BaO content is 20% or higher. The BaO content is more preferably 25% or higher. On the other hand, from the standpoint of obtaining practically sufficient weatherability, the BaO content is 40% or lower. Preferably, the BaO content is 30% or lower. The BaO content is more preferably 29% or lower.

$Gd_2O_3$ is an ingredient for regulating optical properties and is not an essential ingredient in the glass of the invention. As the content of $Gd_2O_3$ increases, unsusceptibility to devitrification becomes worse. $Gd_2O_3$, on the other hand, is a relatively expensive raw material. From the standpoint of both unsusceptibility to devitrification and raw-material cost, the $Gd_2O_3$ content is preferably 20% or lower. More preferably, the $Gd_2O_3$ content is 10% or lower. The $Gd_2O_3$ content is even more preferably 5% or lower.

In the glass of the invention, part of the BaO, which is an essential ingredient, can be replaced by any of MgO, CaO, and SrO, which also are alkaline earth elements. These elements have the effect of stabilizing the glass while lowering yield point Ts, like BaO. However, MgO, CaO, and SrO, on the other hand, reduce refractive index. For this reason, the content of MgO is preferably 10% or lower. More preferably, the MgO content is 5% or lower. The MgO content is even more preferably 1% or lower. For the same reason, the content of CaO is preferably 10% or lower. More preferably, the CaO content is 5% or lower. The CaO content is even more preferably 1% or lower. For the same reason, the content of SrO is preferably 5% or lower. The SrO content is preferably 3% or lower. More preferably, the SrO content is 3% or lower. The SrO content is even more preferably 1% or lower.

Examples of optional ingredients for clarification or another purpose in the glass of the invention include $Sb_2O_3$, $SnO_2$, and $As_2O_3$. From the standpoint of obtaining that effect, the content of each of these ingredients is preferably 0.01% or higher. These ingredients, on the other hand, impair unsusceptibility to devitrification. Because of this, the content of each ingredient is preferably 1% or lower.

With respect to optical properties of the glass of the invention, the refractive index $n_d$ thereof is preferably regulated to 1.55 or higher. More preferably, the refractive index $n_d$ thereof is regulated to 1.57 or higher. The refractive index $n_d$ thereof is especially preferably regulated to 1.58 or higher. On the other hand, for realizing low-dispersion characteristics, it is preferred to regulate the refractive index $n_d$ of the glass of the invention to 1.65 or lower. More preferably, the refractive index nd of the glass of the invention is regulated to 1.63 or lower. The refractive index $n_d$ thereof is especially preferably regulated to 1.61 or lower.

The Abbe number $v_d$ of the glass of the invention is preferably regulated to 55-65. In the glass of the invention, the Abbe number $v_d$ is regulated more preferably to 58 or larger, especially preferably 59 or larger. On the other hand, the Abbe number $v_d$ thereof is regulated more preferably to 63 or smaller, especially preferably 62 or smaller. With respect to the relationship between refractive index $n_d$ and Abbe number $v_d$, it is preferred that when the refractive index $n_d$ is 1.57-1.63, then the Abbe number $v_d$ should be 58-63. Furthermore, it is preferred that when the refractive index $n_d$ is 1.58-1.61, then the Abbe number $v_d$ should be 59-62.

The yield point Ts of the glass of the invention is preferably regulated to 590° C. or lower because this improves mold durability and facilitates press forming. The yield point Ts of the glass of the invention is more preferably 580° C. or lower, especially preferably 570° C. or lower. Among the properties which influence press formability like yield point Ts is liquidus temperature. The lower the liquidus temperature, the easier the forming of the glass. In the glass of the invention, the liquidus temperature is preferably 850° C. or lower. More preferably, the liquidus temperature thereof is 800° C. or lower. The liquidus temperature thereof is especially preferably 750° C. or lower.

With respect to weatherability, the degree of surface alteration in a high-temperature humid environment is evaluated in terms of transmittance change. That the decrease in transmittance through 100-hour holding in an environment having a temperature of 60° C. and a relative humidity of 90%, i.e., [(transmittance before holding)−(transmittance after holding)]/(transmittance before holding), is less than 20% is desirable from the standpoint of weatherability. The decrease in transmittance in the high-temperature humid environment is more preferably less than 10%, even more preferably less than 5%.

EXAMPLES

Embodiments of the invention will be illustrated in detail with reference to the following Examples, but the invention should not be construed as being limited thereto.

Method of Glass Preparation

As a raw material for each of ingredients, use was made of the corresponding oxide, carbonate, nitrate, hydroxide, or the like. Specifically, boric acid was used as a raw material for $B_2O_3$, and commercial alumina or aluminum hydroxide was used as a raw material for $Al_2O_3$. As raw materials for alkali oxides represented by $Li_2O$ and for alkaline earth metal oxides represented by CaO, use was made of the corresponding carbonates and nitrates. Furthermore, as raw materials for other ingredients including $SiO_2$ and $Gd_2O_3$, use was made of the corresponding oxides. Given amounts of these raw materials were weighed out so as to result in each of the chemical ingredients shown in Table 1 and Table 2, and sufficiently mixed together in a powder state. Each resultant mixture was placed in a platinum crucible and melted for 1 hour at a temperature of 1,100-1,200° C. This glass melt was poured and formed into a plate shape. Thereafter, the plate was held at 490° C.-540° C. for 4 hours in order to remove residual stress and then gradually cooled to room temperature at a cooling rate of 1° C./min. Thus, optical glasses were obtained.

[Evaluation]

Refractive index $n_d$ and Abbe number $v_d$ were determined by examining a glass block in which both sides had been mirror-polished and which had a size of 20 mm×20 mm and a thickness of 10 mm with a refractometer (trade name, KPR-2; manufactured by Kalnew Co., Ltd.). Measured values were determined to five decimal places. Each value of refractive index $n_d$ was one obtained by rounding off the found value by correcting to nearest hundredth, while each value of Abbe number $v_d$ was one obtained by rounding off the found value by correcting to nearest tenth.

Yield point Ts (° C.) was determined by examining a sample processed into a cylindrical shape having a diameter of 5 mm and a length of 20 mm with a thermomechanical analyzer (trade name, DIALTOMETER 5000; manufactured by MAC Science Co., Ltd.) at a heating rate of 10° C./min.

Weatherability was evaluated in the following manner. A glass block in which both sides had been mirror-polished and which had a size of 20 mm×20 mm and a thickness of 10 mm was examined for transmittance at a wavelength of 800 nm. Thereafter, this glass block was held for 100 hours in a high-temperature high-humidity chamber whose temperature and humidity were set at 60° C. and 90%, respectively, and was then examined for transmittance again. The weatherability thereof was evaluated in terms of a decrease in transmittance through the holding.

Liquidus temperature (° C.) was determined in the following manner. A glass block of 10 mm×10 mm×10 mm was placed on a dish made of a platinum alloy which was 95% Pt-5% Au. This glass block on the dish was held for 1 hour in an electric furnace set at a high temperature of from 700° C. to 1,000° C. The lowest of the temperatures which did not result in crystal ingredient observation is taken as liquidus temperature. For examining the glass for a crystal ingredient, a microscope (magnification, 100 diameters) was used. The samples in which no crystal ingredient was observed throughout the whole temperature range are indicated by "700 u".

The results of those examinations are shown in Table 1 to Table 3 together with the compositions. In the tables, "−" indicates that the ingredient is absent. Example 1 to Example 12 are Examples according to the invention, and Example 13 and Example 14 are Comparative Examples for the invention. Incidentally, Example 13 is the Example 1 of JP-A-4-37628, which was cited in Background Art in this description, while Example 14 is the Example 2 of JP-A-7-149536, which also was cited therein. Compared to Example 1 to Example 12, Example 13 has an exceedingly high yield point although equal in weatherability. On the other hand, Example 14 has considerably poor weatherability although low in yield point.

TABLE 1

|  |  | Ex. 1 | Ex. 2 | Ex. 3 | Ex. 4 | Ex. 5 |
|---|---|---|---|---|---|---|
| Com- | $SiO_2$ | 40.5 | 40.8 | 40.0 | 39.0 | 39.2 |
| posi- | $B_2O_3$ | 13.7 | 13.8 | 13.5 | 13.7 | 13.5 |
| tion/ | $Na_2O$ | 2.0 | 2.0 | 1.9 | 4.6 | 5.3 |
| % | $K_2O$ | 0.5 | 0.5 | 0.5 | 0.5 | 0.5 |
|  | $Li_2O$ | 5.9 | 5.9 | 5.8 | 5.5 | 4.6 |

TABLE 1-continued

|  | Ex. 1 | Ex. 2 | Ex. 3 | Ex. 4 | Ex. 5 |
|---|---|---|---|---|---|
| ZnO | 3.4 | 5.7 | 3.4 | 3.4 | 3.1 |
| $Al_2O_3$ | 6.8 | 4.0 | 3.9 | 6.8 | 6.7 |
| BaO | 26.9 | 27.0 | 30.7 | 26.5 | 27.2 |
| CaO | — | — | — | — | — |
| $TiO_2$ | — | — | — | — | — |
| SrO | — | — | — | — | — |
| $Gd_2O_3$ | — | — | — | — | — |
| $B_2O_3 + SiO_2$ | 54.2 | 54.6 | 53.5 | 52.7 | 52.7 |
| $Li_2O + Na_2O + K_2O$ | 8.4 | 8.4 | 8.2 | 10.6 | 10.4 |
| $Sb_2O_3$ | 0.3 | 0.3 | 0.3 | — | — |
| Abbe number $v_d$ | 59.7 | 59.3 | 59.5 | 59.0 | 59.0 |
| Refractive index $n_d$ | 1.59 | 1.59 | 1.59 | 1.58 | 1.58 |
| Yield point $T_s$/° C. | 559 | 557 | 558 | 539 | 544 |
| Weatherability/% | 0.2 | 2.6 | 2.1 | 3.2 | 3.2 |
| Liquidus temperature/° C. | 760 | 700u | 700u | 740 | 700u |

TABLE 2

|  |  | Ex. 6 | Ex. 7 | Ex. 8 | Ex. 9 | Ex. 10 |
|---|---|---|---|---|---|---|
| Composition/% | $SiO_2$ | 39.2 | 41.5 | 38.4 | 39.1 | 37.8 |
| | $B_2O_3$ | 13.5 | 13.6 | 13.7 | 14.0 | 13.4 |
| | $Na_2O$ | 5.8 | 2.0 | 5.3 | 6.0 | 4.7 |
| | $K_2O$ | 0.5 | 0.5 | 0.5 | 0.5 | 0.5 |
| | $Li_2O$ | 4.8 | 5.9 | 4.6 | 4.3 | 4.9 |
| | ZnO | 2.3 | 3.4 | 3.0 | 3.1 | 3.0 |
| | $Al_2O_3$ | 5.3 | 3.9 | 6.6 | 5.3 | 8.0 |
| | BaO | 28.6 | 26.7 | 27.8 | 27.9 | 27.8 |
| | CaO | — | — | — | — | — |
| | $TiO_2$ | — | — | — | — | — |
| | SrO | — | — | — | — | — |
| | $Gd_2O_3$ | — | 2.5 | — | — | — |
| | $B_2O_3 + SiO_2$ | 52.7 | 55.1 | 52.1 | 53.1 | 51.2 |
| | $Li_2O + Na_2O + K_2O$ | 11.1 | 8.4 | 10.4 | 10.8 | 10.1 |
| | $Sb_2O_3$ | — | — | — | — | — |
| Abbe number $v_d$ | | 59.2 | 59.5 | 59.2 | 59.4 | 59.2 |
| Refractive index $n_d$ | | 1.58 | 1.59 | 1.58 | 1.58 | 1.58 |
| Yield point $T_s$/° C. | | 545 | 564 | 544 | 547 | 542 |
| Weatherability/% | | 4.6 | 0.2 | 1.5 | 2.5 | 1.2 |
| Liquidus temperature/° C. | | 700u | 700u | 750 | 700u | 790 |

TABLE 3

|  |  | Example 11 | Example 12 | Example 13 | Example 14 |
|---|---|---|---|---|---|
| Composition/% | $SiO_2$ | 41.2 | 38.2 | 40.5 | 27.4 |
| | $B_2O_3$ | 13.8 | 13.6 | 16.1 | 40.0 |
| | $Na_2O$ | 2.0 | 2.0 | — | — |
| | $K_2O$ | 0.5 | 0.5 | — | — |
| | $Li_2O$ | 5.9 | 5.9 | 4.5 | 6.0 |
| | ZnO | 4.0 | 5.1 | — | 4.6 |
| | $Al_2O_3$ | 5.4 | 8.1 | 5.9 | — |
| | BaO | 27.1 | 26.7 | 31.5 | 2.0 |
| | CaO | — | — | 1.5 | 7.0 |
| | $TiO_2$ | — | — | — | 1.0 |
| | SrO | — | — | — | 11 |
| | $Gd_2O_3$ | — | — | — | — |
| | $B_2O_3 + SiO_2$ | 55.0 | 51.8 | 56.6 | 67.4 |
| | $Li_2O + Na_2O + K_2O$ | 8.4 | 8.4 | 4.5 | 6.0 |
| | $Sb_2O_3$ | — | — | — | 1.0 |
| Abbe number $v_d$ | | 55.5 | 59.3 | 61.0 | 59.7 |
| Refractive index $n_d$ | | 1.59 | 1.59 | 1.59 | 1.59 |
| Yield point $T_s$/° C. | | 560 | 547 | 605 | 537 |
| Weatherability/% | | 2.4 | 1.1 | 4.0 | 23.3 |
| Liquidus temperature/° C. | | 730 | 790 | — | — |

While the invention has been described in detail and with reference to specific embodiments thereof, it will be apparent to one skilled in the art that various changes and modifications can be made therein without departing from the spirit and scope thereof.

This application is based on a Japanese Patent Application No. 2006-141852 filed May 22, 2006, the contents thereof being herein incorporated by reference.

INDUSTRIAL APPLICABILITY

According to the invention, an optical glass which satisfies all of a refractive index $n_d$ of 1.55-1.65, Abbe number $v_d$ of 55-65, and yield point of 600° C. or lower and has excellent weatherability is easily obtained. Namely, an optical glass can be provided which satisfies the optical properties required of optical lenses presently in wide use and which has excellent weatherability and low-temperature-softening properties and hence greatly improves productivity.

The invention claimed is:

1. An optical glass which consists of, in terms of % by mass on the basis of oxides,
   37-45% of $SiO_2$,
   12-20% of $B_2O_3$,
   2-7% of $Li_2O$,
   0.1-10% of ZnO,
   2-15% of $Al_2O_3$,
   25-30.7% of BaO,
   0-5% of $K_2O$,
   0-10% of $Na_2O$,
   0-20% of $Gd_2O_3$,
   optionally at least one selected from the group consisting of 0-10% of MgO, 0-5% of CaO, and 0-5% of SrO, such that BaO+MgO+CaO+SrO is 25-40%, and
   optionally at least one selected from the group consisting of 0.01-1% of $Sb_2O_3$, 0.01-1% of $SnO_2$, and 0.01-1% of $As_2O_3$
   wherein
   $SiO_2+B_2O_3$ is 47-58%;
   $Li_2O+Na_2O+K_2O$ is 6-14%; and
   the optical glass has an Abbe number $v_d$ of 58-65.

2. The optical glass of claim 1, which has a refractive index $n_d$ of 1.55-1.65.

3. The optical glass of claim 1, which has a yield point Ts of 590° C. or lower.

4. The optical glass of claim 1, which shows a decrease in transmittance of less than 20% after being held for 100 hours in an environment having a temperature of 60° C. and a relative humidity of 90%.

5. The optical glass of claim 1, which comprises 37-43% of $SiO_2$.

6. The optical glass of claim 1, which comprises 12.5-16% of $B_2O_3$.

7. The optical glass of claim 1, wherein $SiO_2+B_2O_3$ is 48-55.5%.

8. The optical glass of claim 1, which comprises 3-6.5% of $Li_2O$.

9. The optical glass of claim 1, which comprises 1-6% of ZnO.

10. The optical glass of claim 1, which comprises 3-10% of $Al_2O_3$.

11. The optical glass of claim 1, which comprises 25-30% of BaO.

12. The optical glass of claim 1, which comprises 0-3% of $K_2O$.

13. The optical glass of claim 1, which comprises 0.1-8% of $Na_2O$.

14. The optical glass of claim 1, wherein $Li_2O+Na_2O+K_2O$ is 7-14%.

15. The optical glass of claim 1, which comprises 0-10% of $Gd_2O_3$.

16. The optical glass of claim 1, which has a refractive index $n_d$ of 1.57-1.63.

17. The optical glass of claim 1, which has an Abbe number $v_d$ of 58-63.

18. A method of making an optical glass, the method comprising
melting a mixture of raw material powders; and
producing the optical glass of claim 1.

* * * * *